US006667813B2

(12) United States Patent
Saruwatari et al.

(10) Patent No.: US 6,667,813 B2
(45) Date of Patent: *Dec. 23, 2003

(54) DATA COMMUNICATION APPARATUS CONNECTED TO EXTERNAL INFORMATION PROCESSING TERMINAL THROUGH INTERFACE

(75) Inventors: Masaru Saruwatari, Kawasaki (JP); Seishi Ejiri, Kawasaki (JP); Soichi Yamamuro, San Jose, CA (US); Masaya Kondo, Great Neck, NY (US); Takekazu Kumagai, Yokohama (JP); Takeshi Tsukamoto, Kawasaki (JP); Masaki Toyama, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 124 days.

(21) Appl. No.: 08/813,288

(22) Filed: Mar. 10, 1997

(65) Prior Publication Data

US 2001/0043339 A1 Nov. 22, 2001

(30) Foreign Application Priority Data

Mar. 12, 1996 (JP) ............................................. 8-054741
Nov. 28, 1996 (JP) ............................................. 8-317886

(51) Int. Cl.$^7$ ............................................. G06K 15/00
(52) U.S. Cl. ..................................... 358/1.15; 358/442
(58) Field of Search ............................... 358/404, 405, 358/406, 434, 435, 436, 438, 439, 468, 442, 1.1–1.9, 1.11–1.18; 395/839; 399/8

(56) References Cited

U.S. PATENT DOCUMENTS

| 5,051,601 | A | * | 9/1991 | Atobe et al. ................. 250/551 |
| 5,127,047 | A | * | 6/1992 | Bell et al. .................... 358/439 |
| 5,220,674 | A | * | 6/1993 | Morgan et al. .............. 395/800 |
| 5,333,062 | A | * | 7/1994 | Hara et al. ................... 358/441 |
| 5,477,338 | A | * | 12/1995 | Fujii et al. ................... 358/468 |
| 5,485,246 | A | * | 1/1996 | Hayashi et al. ................ 399/8 |
| 5,519,508 | A | * | 5/1996 | Murayama ................... 358/439 |
| 5,673,118 | A | | 9/1997 | Kondo et al. ................ 358/437 |
| 5,706,210 | A | * | 1/1998 | Kumano et al. ............. 364/514 |
| 5,720,014 | A | | 2/1998 | Ikeda et al. .................. 395/114 |
| 5,726,768 | A | | 3/1998 | Ishikawa et al. ............. 358/442 |
| 5,946,105 | A | | 8/1999 | Oishi et al. .................. 358/434 |

* cited by examiner

Primary Examiner—Gabriel Garcia
Assistant Examiner—King T. Poon
(74) Attorney, Agent, or Firm—Fitzpatrick, Cella, Harper & Scinto (57) ABSTRACT

In the communication between a facsimile apparatus and an information processing terminal, the communication of status information of the facsimile apparatus is efficiently effected and an operation efficiency of the apparatus is improved. In response to a command from the information processing terminal, information indicating a change in the status of the facsimile apparatus is set in a response transmitted from the facsimile apparatus to the information processing terminal, and the information processing terminal conducts a communication request of the status information of the facsimile apparatus in accordance with the information.

24 Claims, 9 Drawing Sheets

| STATE ITEMS | SPECIFIED STATES | | | | |
|---|---|---|---|---|---|
| ADF | PRESENCE/ABSENCE OF DOCUMENT SHEET | WIDTH OF DOCUMENT SHEET | | | |
| CASSETTE FOR RECORDING PAPER | | | PRESENCE/ABSENCE OF RECORDING PAPER IN CASSETTE | SIZE OF RECORDING PAPER | PRESENCE/ABSENCE OF RECORDING PAPER |
| PRINTER COVER | | | | | OPEN/CLOSE |
| COMMUNICATION STATE (PHASE) | | | | | |

DATA COMMUNICATION APPARATUS CONNECTED TO EXTERNAL INFORMATION PROCESSING TERMINAL THROUGH INTERFACE

BACKGROUND OF THE INVENTION

1. Field of the Invention

The present invention relates to a data communication apparatus connected to an external information processing terminal through an interface.

2. Related Background Art

A facsimile communication system in which a facsimile apparatus and an external information terminal are connected through an interface to form the facsimile communication system, and the facsimile transmission is commanded from the external information processing terminal to the facsimile apparatus or a document prepared on the external information processing terminal is printed out by the facsimile apparatus, has recently been widely used. Further, a system in which an external information processing terminal having a facsimile apparatus connected thereto is connected to a LAN (local area network) to allow an operation similar to that of the facsimile apparatus from a plurality of information processing terminals has become populated. In such a facsimile communication system, the IEEE P1284 which is a bilateral parallel interface has been widely used as an interface to connect the facsimile apparatus and the external information processing terminal. In the facsimile communication system which adopts the IEEE P1284 as the interface, the data exchange with command and response is started by sending a command from the external information processing terminal which serves as a host, and the facsimile apparatus which serves as a peripheral device merely returns a response to a command from the host. Under this environment, information as to whether the facsimile apparatus is in transmission, in reception or in an abnormal condition is informed from the facsimile apparatus to the external information processing terminal by issuing from the external information processing terminal a command to acquire the status of the facsimile apparatus.

However, in the prior art system, when the facsimile apparatus of the facsimile communication system is in the transmission state or the reception state, information such as the exhaustion of record sheets or an error in the printer cannot be informed until the inquiry is made by the external information processing terminal to the facsimile apparatus about the status of the record sheets and the printer after the completion of the transmission or reception being processed. In order to solve the above problem, the external information processing terminal must sequentially inquire to the facsimile apparatus about anticipated events such as the exhaustion of the record sheets at any time during the operation such as in the transmission or in the reception. It is very troublesome and the process that should be executed in the external information processing terminal increases, a system throughput is reduced, and an operation efficiency is lowered.

SUMMARY OF THE INVENTION

It is an object of the present invention to provide a data communication apparatus in light of the above problems.

It is another object of the present invention to allow efficient transmission of information on the data communication apparatus with an information processing terminal.

Other objects of the present invention will be apparent from the following detailed description of the embodiments.

DETAILED DESCRIPTION OF THE PREFERRED EMBODIMENTS

An embodiment of the present invention is now explained in detail with reference to the drawings.

In the embodiment, a facsimile communication system in which an information processing terminal (personal computer or the like) and a facsimile apparatus are connected through a bilateral parallel interface is explained.

Figure 1:
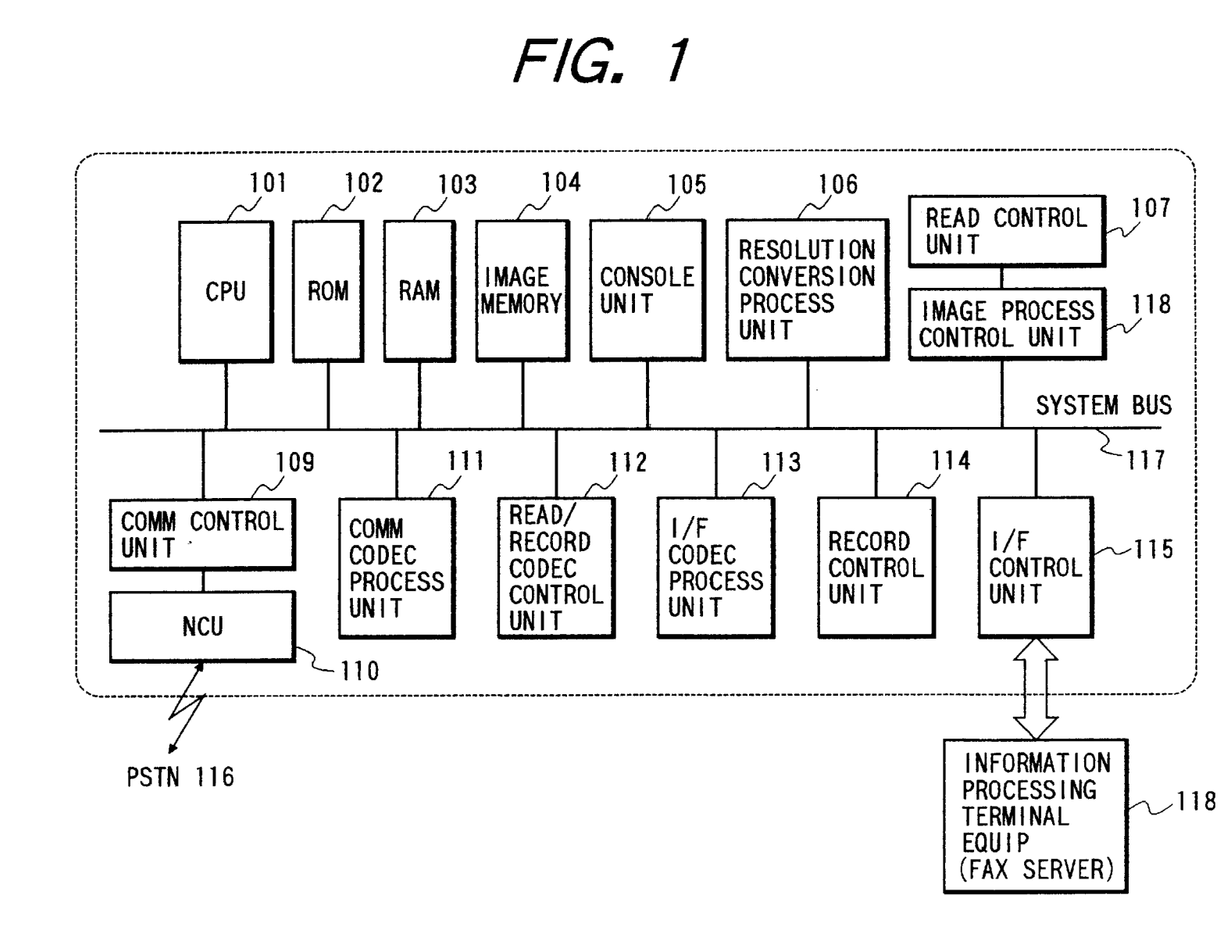
FIG. 1 shows a block diagram of a configuration of a facsimile communication system in accordance with an embodiment of the present invention.

FIG. 1 shows a block diagram of a configuration of the facsimile communication system of the present embodiment.

A CPU 101 is a system control unit which controls the overall facsimile apparatus through a system bus 117 and it comprises a microcomputer. A ROM 102 stores a control program and an operating system (OS) program of the CPU 101. A RAM 103 comprises an SRAM and stores program control variables. Settings registered by an operator, system management data and various working buffers are also stored in the RAM 103. An image memory 104 comprises a DRAM and stores image data. In the present embodiment, the control program stored in the ROM 102 is executed by software control such as scheduling or task switching under control of the OS stored in the ROM 102.

A console unit (or operation unit) 105 comprises various keys, LEDs and LCDs and allows various entry operations by an operator and conducts the display of an operation status of the facsimile communication system.

A read control unit 107 comprises a CS (contact type) image sensor and a document sheet feed mechanism. The read control unit 107 optically reads a document sheet by using the CS image sensor, converts it to an electrical image data, applies thereto various image processing such as a binarization process and a gray level process by an image processing control unit 108, and outputs highly fine image data. The converted image data is coded in accordance with a predetermined coding scheme through a read recording code/decode control unit 112 and it is stored in the image memory 104.

A record control unit 114 comprises a page printer and a record image processing control unit. The record control unit 114 decodes image data to be recorded by the read recording code/decode control unit 112, applies a smoothing process and a record density correction process thereto by image processing control unit to convert it to highly fine image data and outputs it to the page printer.

A communication control unit 109 comprises a modem and modulates and demodulates facsimile transmission/reception signals. An NCU (network control unit) 110 sends a selection signal (dial pulse or tone dial signal) to an analog communication line (PSTN) 116, detects a call signal from the communication line and controls a line of automatic reception control. The image data stored in the image memory 104 is decoded by a communication code/decode processing unit 111, and millimeter-inch conversion and magnify/reduce processing are conducted by a resolution conversion processing unit 106. The resolution-converted image is coded by the communication code/decode processing unit 111 in accordance with an ability of a destination station, and it is transmitted.

An I/F control unit 115 conducts interface control with an externally connected information processing terminal (FAX server) 118. In the present embodiment, it conforms to a parallel interface such as the bilateral Centronics Interface (parallel interface which conforms to the IEEE P1284).

Remote operations such as transmission from the FAX server 118 to the facsimile apparatus, the print and the data registration are conducted by transmitting predetermined command parameter data to the facsimile apparatus through the I/F control unit 115. In the present embodiment, application software and driver software for controlling the remote operations and remote operation requests are installed in the FAX server 118.

An operation of the above arrangement is now explained.

Figure 2:
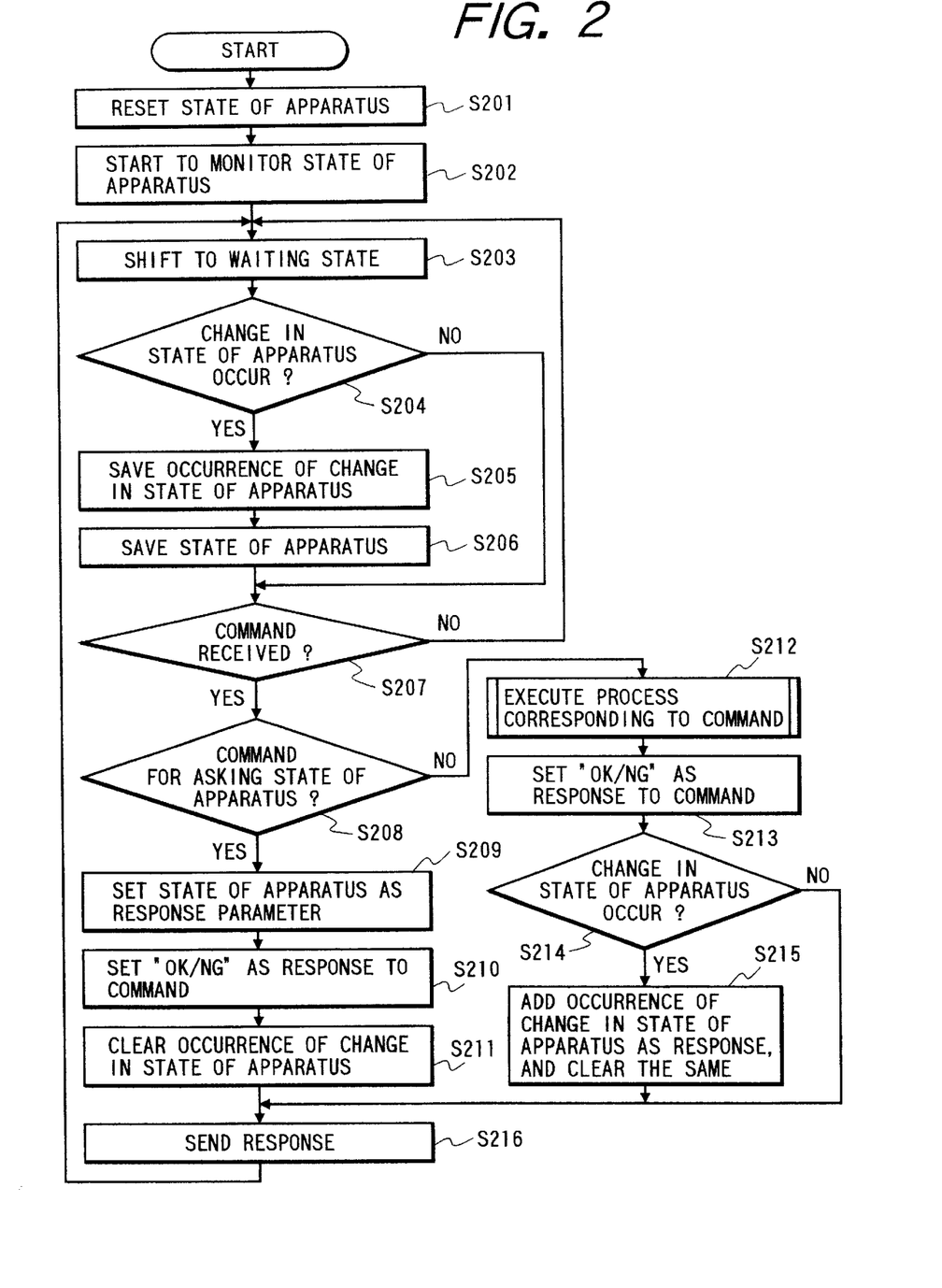
FIG. 2 shows a flow chart of a control operation of a CPU 101 of a facsimile apparatus.

FIG. 2 shows a flow chart of a control operation of the CPU 101 of the facsimile apparatus of the present embodiment. A program for executing the control operation shown in the flow chart is stored in the ROM 102 as described above.

First, when the facsimile apparatus is started, the CPU 101 resets an area on the RAM 103 representing the status of the apparatus (S201). Then, the apparatus status monitoring (the monitoring of the presence/absence of the record sheets, the record sheet size, the execution status of the facsimile apparatus and an error status of the apparatus) is started (S202), and the process shifts to a wait status (S203). The CPU 101 determines whether a change has occurred in the apparatus status by the apparatus status monitoring (S204). If a change has occurred in the apparatus status, the information of apparatus status change is held in the RAM (S205), and the information of the apparatus status is also stored in the RAM (S206). If no change occurs in the apparatus status, the steps S205 and S206 are skipped.

Then, whether a command has been received from the external information processing terminal 118 or not is determined (S207). If the command has not been received, the steps S203 to S207 are repeatedly executed. If the command is received from the external information processing terminal 118, whether the command is one to inquire the status of the facsimile apparatus or not is determined (S208). If it is the command to inquire the apparatus status, the information of the apparatus status stored in the RAM is set as a response parameter (S209), a response to the apparatus status inquiry command is set (S210), the apparatus status change information on the RAM is erased (S211) and a response is sent to the external information processing terminal 118 through the I/F control unit 115 (S216). If the received command is not the apparatus status inquiry command, a process for the received command is executed (S212) and a response (OK/NG) for the command is set (S213). The CPU 101 checks the presence or absence of the apparatus status change information on the RAM (S214), and if the apparatus status has been changed, the apparatus status change information is added to the response set in the step S213, and the apparatus status change information is erased from the RAM (S215). If the apparatus status has not been changed in the step S214, the process proceeds from S214 to S216 to send a response to the external information processing terminal 118 through the I/F control unit 115. When the response is sent, the process returns to the waiting state (S203).

An operation of the external information processing terminal 118 in the present embodiment is now explained.

Figure 3:
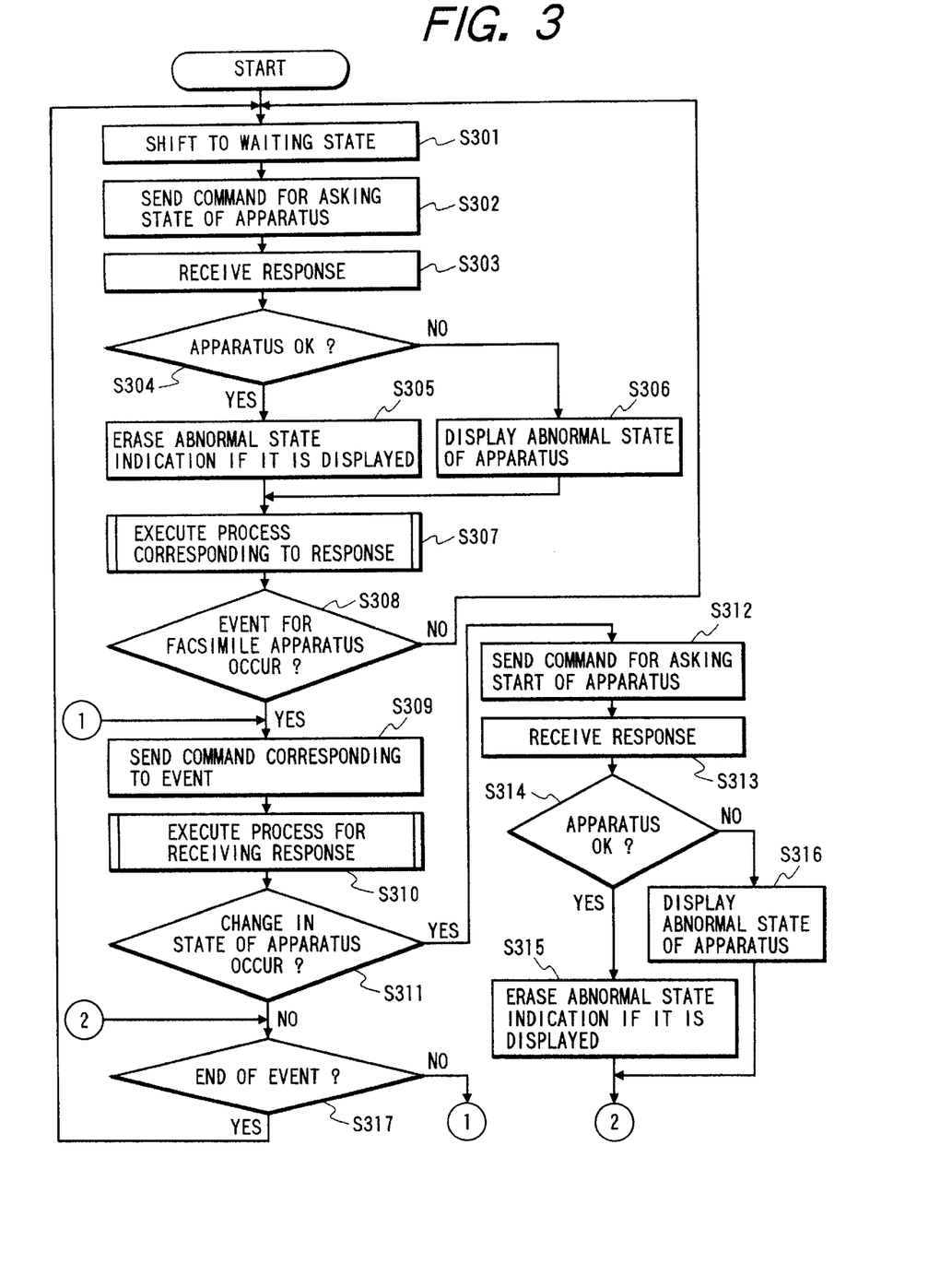
FIG. 3 shows a flow chart of a process executed by an information processing terminal.

FIG. 3 shows a flow chart of a process operation of the external information processing terminal 118 in the present embodiment. The process operation shown in the flow chart is executed by a computer application program stored in a hard disk or the RAM of the information processing terminal (computer) by software control under the OS.

First, the information processing terminal 118 shifts to the wait state as the interface control with the facsimile apparatus (S301), and causes the facsimile apparatus to send an apparatus status inquiry command (S302). If then receives a response to the apparatus status inquiry command from the facsimile apparatus through the interface (S303) and determines whether the apparatus status is normal or not (S304). If the facsimile apparatus status is normal, and abnormal display, if any, on the display of the information processing terminal is erased (S305). If the facsimile apparatus is abnormal, the abnormal state of the facsimile apparatus is displayed on the display (S306). Then, a process corresponding to the response received from the facsimile apparatus is executed (S307).

Then, whether an event to the facsimile apparatus has occurred by the operation of the console unit (keyboard or pointing device) of the external information processing terminal 118 or not is determined, and if the event has not occurred, the process returns to S301. If the event to the facsimile apparatus has occurred, the facsimile apparatus is caused to send a command corresponding to that event through the interface (S309). A reception process of the response to the sent command is executed (S310), and when the response is received, whether the apparatus status change information has been added to the received response or not is determined (S311). If the apparatus status change information has been added to the received response, the facsimile apparatus is caused to send an apparatus status inquiry command (S312). When a response to the apparatus status inquiry command is received from the facsimile apparatus (S313), whether the facsimile apparatus is in a normal state or not is determined based on the received response (S314), and if the facsimile apparatus is in the normal state, the abnormal display, if any, on the display is erased (S315). If the facsimile apparatus is in the abnormal state, the abnormal state of the facsimile apparatus is displayed on the display (S316). Then, whether the event is completed or not is determined (S317), and if the event has not been completed, the command for that event is continuously sent (S309), and if the event is completed, the process returns to the wait state (S301).

In S311, if the status change of the facsimile apparatus is not included, whether the event has been completed or not is determined (S317), and if the event is not completed, the command is continuously sent (S309), and if the event is completed, the process returns to the wait state (S301).

In the above process, when the external information processing terminal 118 recognizes the status change of the facsimile apparatus, the apparatus status inquiry command is immediately sent. Alternatively, the external information processing terminal 118 may send the apparatus status inquiry command to the facsimile apparatus after the completion of the execution of the currently executed event.

Further, detailed information of the status of the facsimile apparatus may be included in the information added in the response sent by the facsimile apparatus, and the external information processing terminal 118 may first check the presence or absence of the status change, and if it is determined that the apparatus status change information has been added, the detailed status information of the facsimile apparatus added to the response may be analyzed so that the sending of the apparatus status inquiry command may be omitted.

In the description of the flow chart of FIG. 2, the detail of the detection of the status change executed by the facsimile apparatus is not described. Referring to FIGS. 4, 5A, 5B, 6A, 6B and 7, the scanner unit (read control unit 107) of the facsimile apparatus, the printer unit (record control unit 114), the detection of the communication status and the notice of the information are explained in detail.

Figure 4:
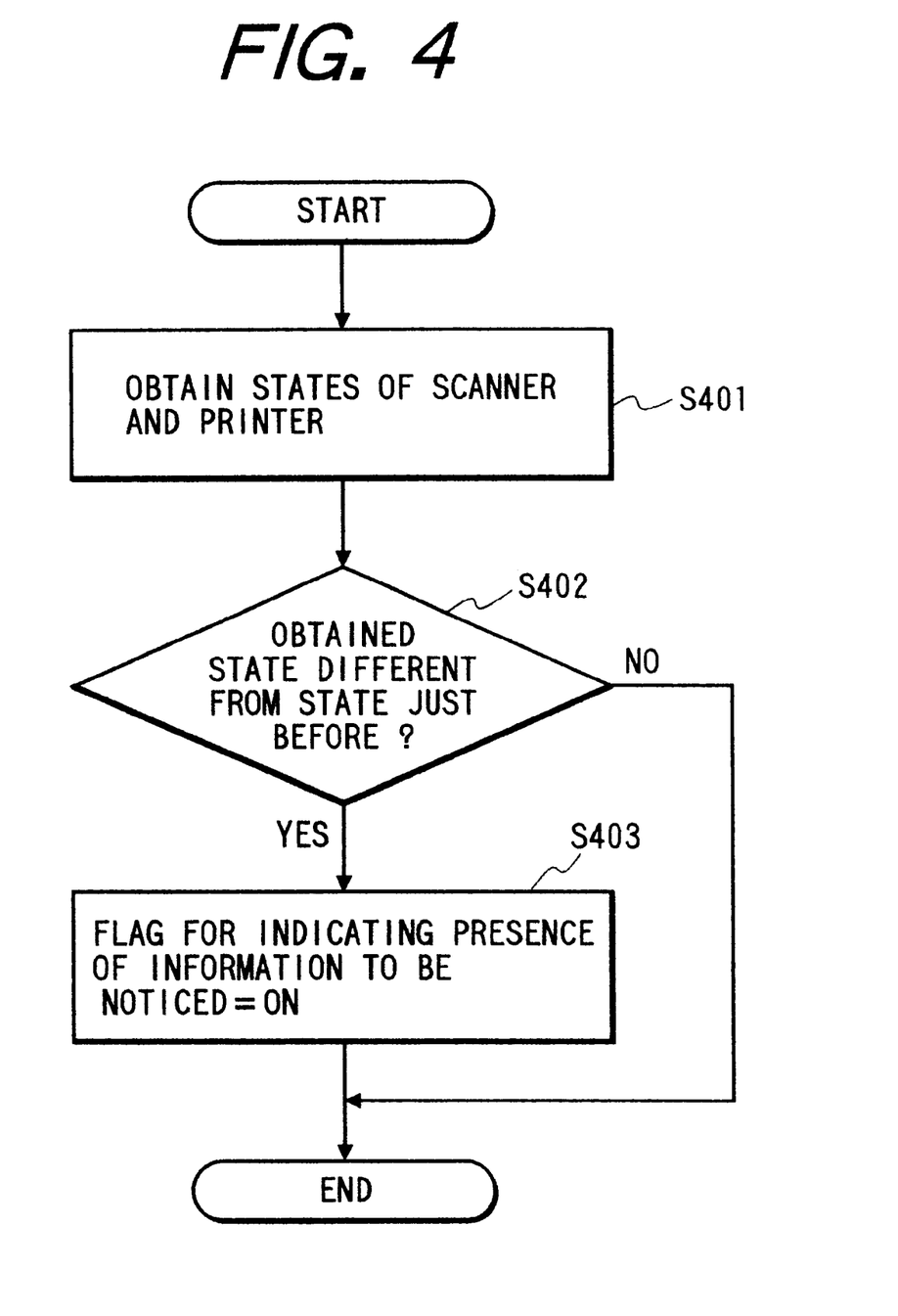
FIG. 4 shows a flow chart of a control operation of the CPU 101 of the facsimile apparatus, FIGS. 5A and 5B, combined as FIG. 5, show flow charts of a control operation of the CPU 101 of the facsimile apparatus, FIGS. 6A and 6B, combined as FIG. 6, show flow charts of a control operation of the CPU 101 of the facsimile apparatus.
Figures 5, 5A:
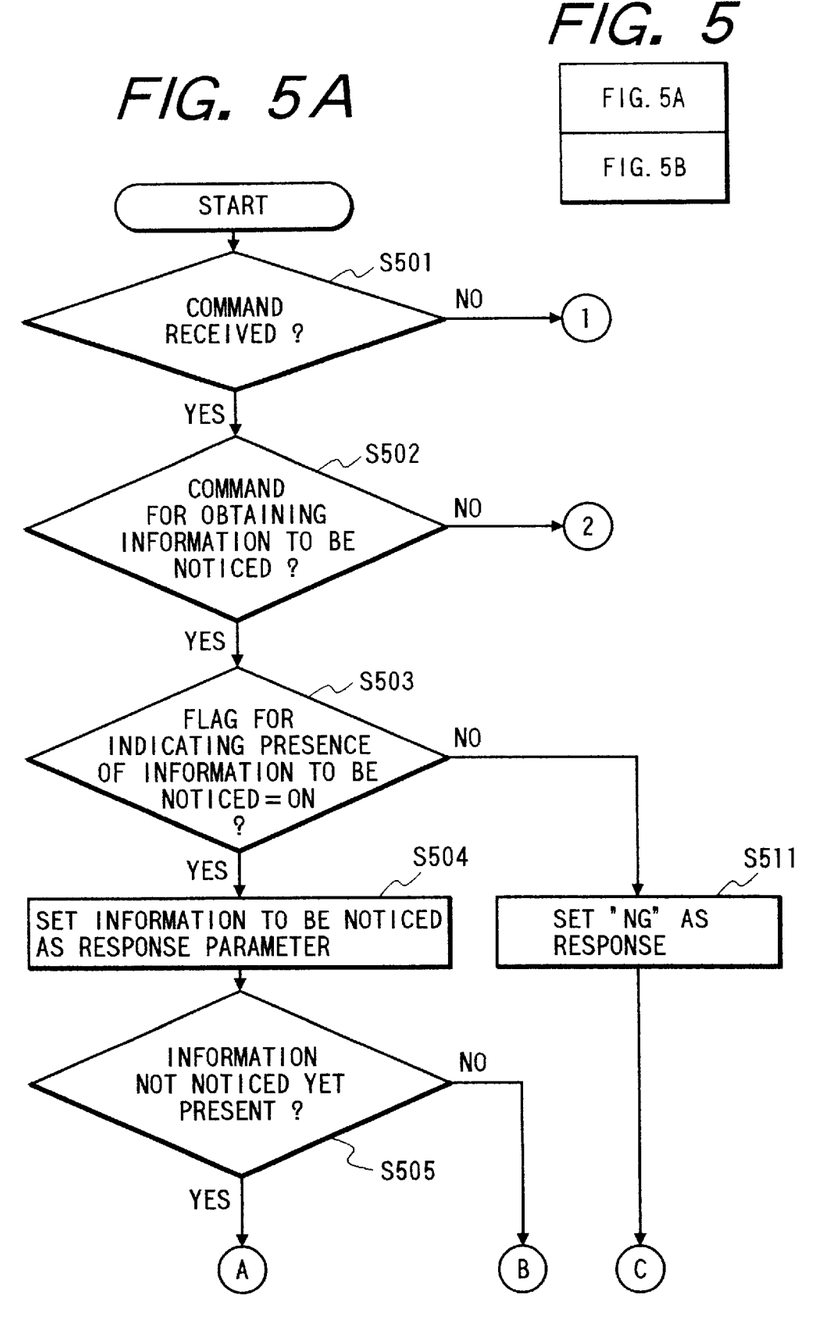
Figure 5B:
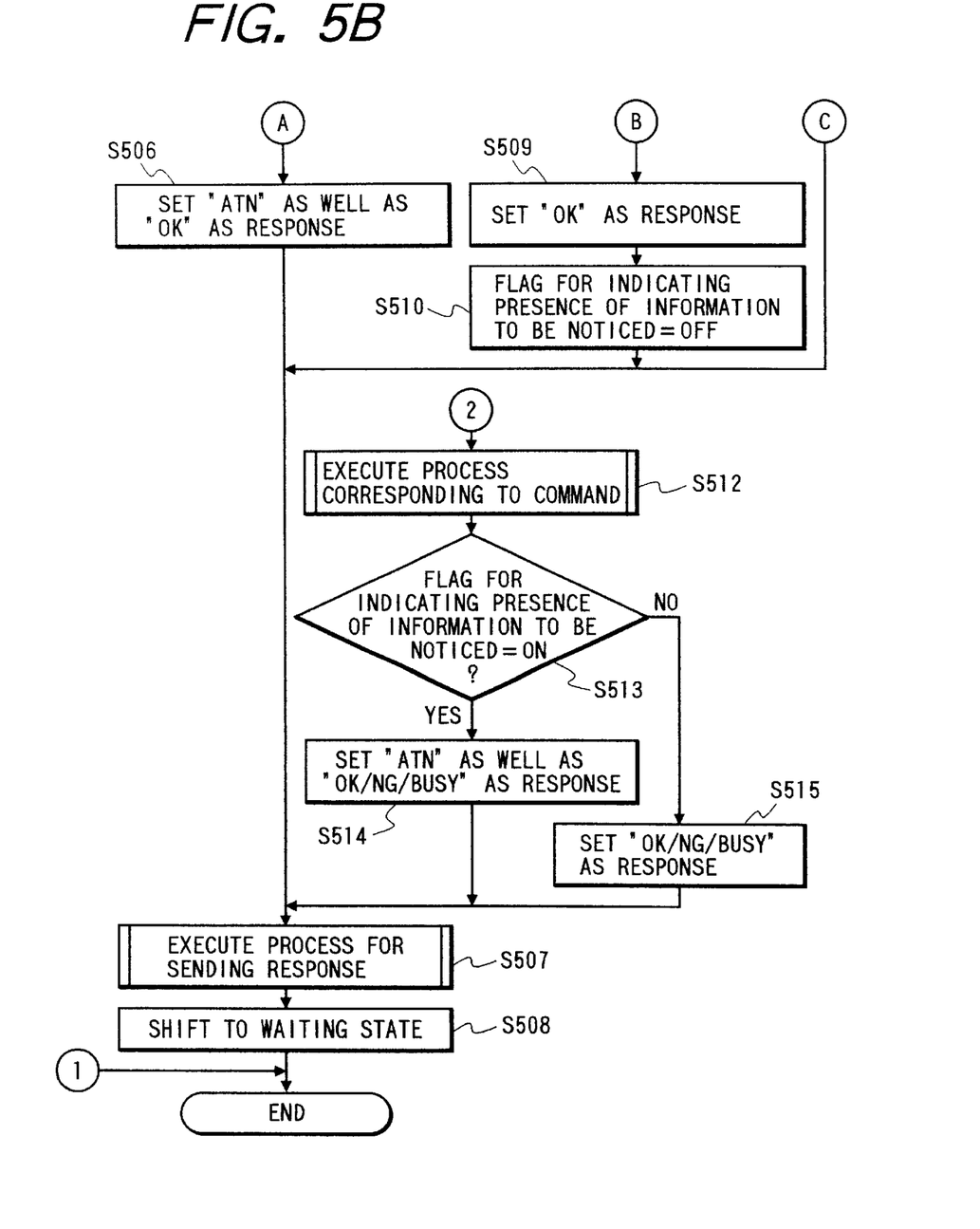

FIGS. 4, 5A and 5B show flow charts of control operations of the CPU 101. A program for executing such control operation is stored in the ROM 102.

Referring to the flow chart of FIG. 4, the processes to acquire the status of the scanner unit and the printer unit and the communication status are explained.

Figure 7:
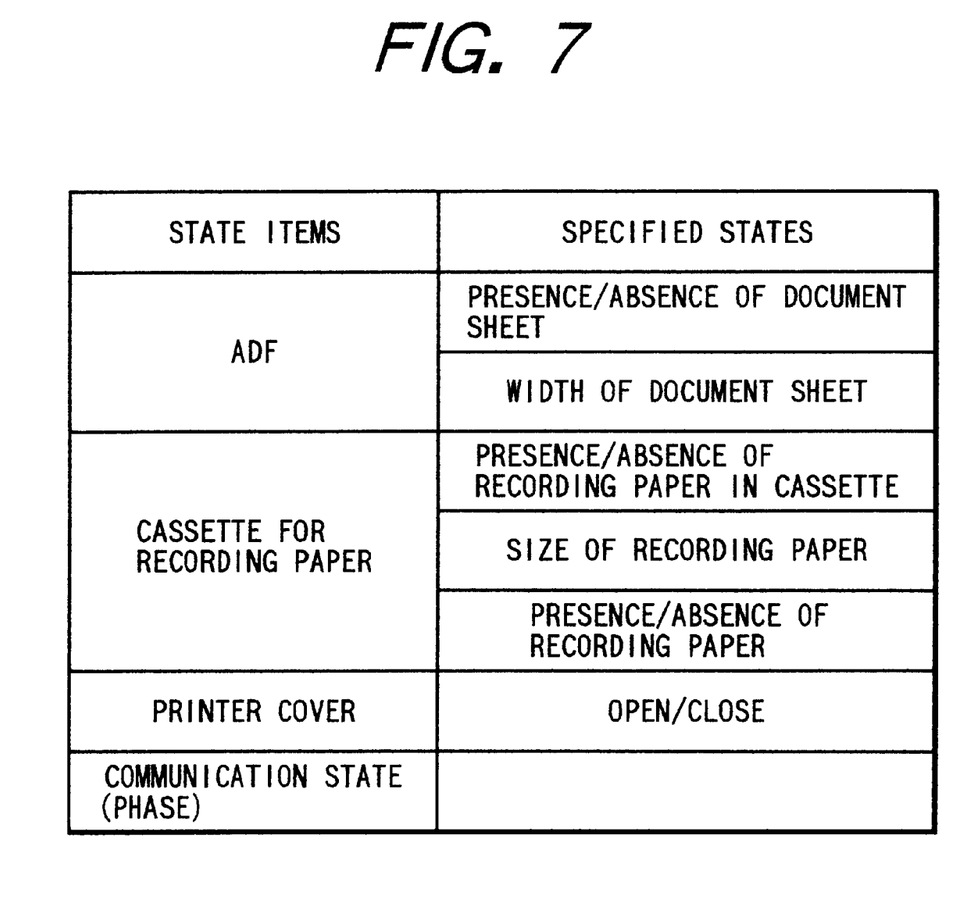
FIG. 7 shows status information of the facsimile apparatus.

The CPU 101 of the facsimile apparatus periodically acquires the status information of the scanner unit (read control unit 107) and the printer unit (record control unit 114) (S401). FIG. 7 shows detailed items of the information of the apparatus status (information to be acquired) stored in a predetermined area of the RAM. The information to be acquired includes the presence or absence of a document sheet on an ADF (automatic document sheet feeder), information on the width of the document sheet, the presence or absence of a cassette in the printer unit (record control unit 114), the record sheet size, the presence or absence of the record sheet, the open/close state of the cover of the printer unit and the communication status (communication phase status) information. The acquired information is compared with the information stored in the RAM prior to the acquisition to determine whether the newly acquired information is different from the information stored in the RAM (S402), and if it is different from the previously stored information, the newly acquired information is written into a predetermined area of the RAM of the facsimile apparatus, and a notice information (apparatus status change information) flag for indicating that the information to be noticed to the external information processing terminal 118 connected to the facsimile apparatus is present is set (S403). If there is no change in the acquired information, the process returns from S402 to the wait state.

The process shown in the flow chart of FIG. 4 is periodically started by a timer and periodically executed by the CPU 101.

FIGS. 5A and 5B show flow charts of a control operation of the CPU 101 of the facsimile apparatus when a command is received from the external information processing terminal 118, and a program for executing such control operation is stored in ROM 102.

When the CPU 101 of the facsimile apparatus detects the reception of the command from the external information processing terminal 118 (S501), it determines whether the received command is a notice information acquire command (apparatus status inquiry command) for acquiring the notice information (status information) possessed by the facsimile apparatus or not (S502). If the received command is the notice information acquire command, whether the notice information flag has been set or not is determined (S503), and if the notice information flag has been set, the notice information of the RAM of FIG. 7 is set to the response as a response parameter (S504). Whether all notice information have been set in the parameters of the response of the notice information acquire command or not is determined (S505), and if unnoticed notice information remains, "ATN" indicating the unnoticed information is set (S506) in addition to the "OK" response for the notice information acquire command, the response is sent to the external information processing terminal 118 through the I/F control unit 115 (S507), and the process stands by the reception of the next command (S508). In S505, if all notice information have been set in the response parameters, the "OK" response to the notice information acquire command is set (S509), the notice information flag is reset (S510), and the process proceeds to the sending of the response.

In S503, if the notice information flag has not been set, "NG" is set as the response to the notice information acquire command (S511) and the process proceeds to the sending of the response (S507).

In S502, if the received command is not the notice information acquire command, a process for the received command is executed (S512), whether the notice information flag has been set or not is determined (S513), and if the notice information flag has been set, "ATN" indicating that the unnoticed notice information is present is set in the response (OK/NG/BUSY) for the received command (S514), and the process proceeds to the sending of the response (S507). In S513, if the notice information flag has not been set, the response (OK/NG/BUSY) to the received command is set (S515) and the process proceeds to the sending of the response (S507).

If the command is not received, the process continuously waits to stand by the reception of the command from the external information processing terminal 118.

In the above process, when the unnoticed notice information (apparatus status information) is present, the facsimile apparatus sends the unnoticed notice information to the external information processing terminal 118. Accordingly, the information once noticed to the external information processing unit 118 is no longer noticed. When the information processing terminal detects that "ATN" indicating the presence of the unnoticed information is set in the response, it can recognize the change of the status of the facsimile apparatus so that it sends the notice information acquire command to the facsimile apparatus and acquires the changed status information. The information processing terminal holds the notice information received from the facsimile apparatus in the memory, and it is updated by the received notice information so that it may recognize the status of the facsimile apparatus by the notice information in the memory. The information processing terminal sends the notice information acquire command for confirming the status of the facsimile apparatus to the facsimile apparatus, and when it receives the "NG" response, it recognizes that the facsimile apparatus status has not been changed from the notice information in the memory and determines that the notice information in the memory is the current facsimile apparatus status. When there is a change in the facsimile status, the changed status information is managed as the unnoticed notice information and the unnoticed notice information is set to the response for the notice information acquire command from the external information processing terminal 118 so that the status information of the facsimile apparatus is communicated efficiently.

Figures 6, 6A:
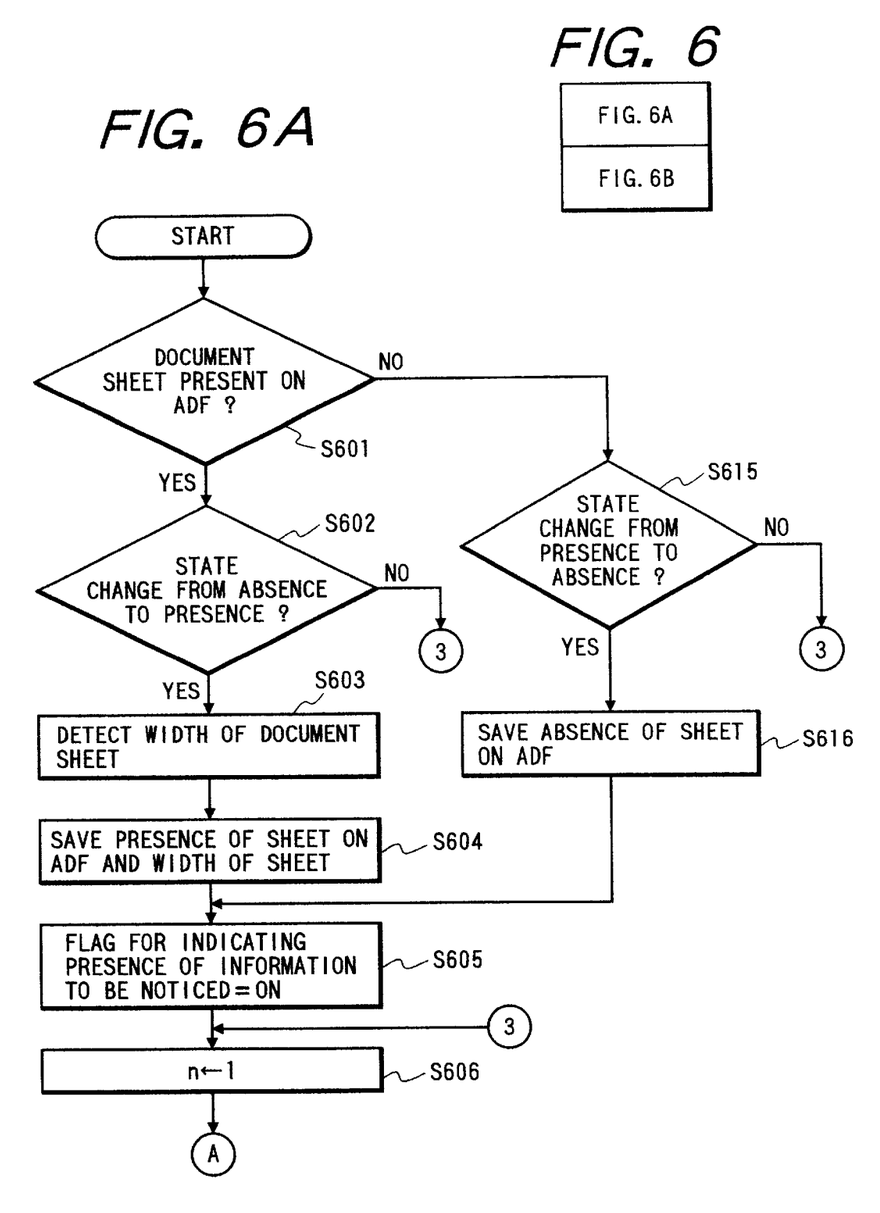
Figure 6B:
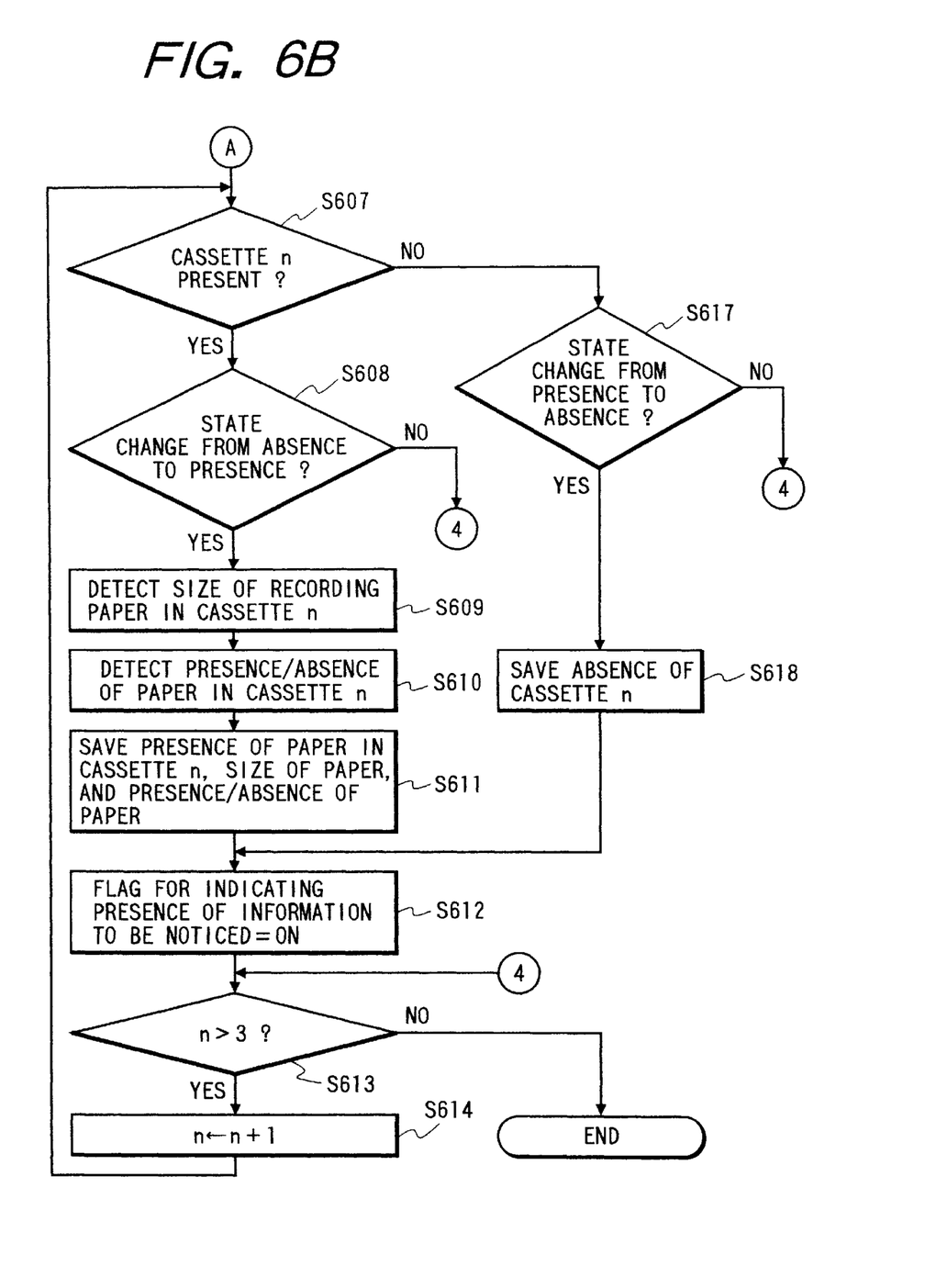

FIGS. 6A and 6B show flow charts of the status information acquire process of the scanner unit (read control unit 107) and the printer unit (record control unit 114) executed by the CPU 101. A control program for executing the process shown in the flow chart is stored in the ROM 102.

Usually, in the scanner unit, a sensor for detecting the presence or absence of the document sheet and a sensor for detecting the document sheet width are separate ones, and when the presence of the document sheet is detected by the document sheet sensor, the document sheet width detection output currently outputted by the document sheet width sensor is acquired as the document sheet width information. Thus, when the document sheet is set, "presence of document sheet" information is generated, and then the output of the document sheet width sensor is identified and the "document sheet width" information is acquired from the identification result. Those two information may be concurrently noticed to the external information processing terminal and the concurrent notice leads to the improvement of the system throughput. Similarly, as to the record sheet cassette, the information on the presence or absence of cassette, the presence or absence of record sheet and the record sheet size are concurrently noticed to the external information processing terminal 118 for the respective cassettes of the facsimile apparatus.

In the present embodiment, the periodic acquisition of the status information of the scanner unit and the printer unit determines the presence or absence of the document sheet in the ADF based on the output from the document sheet sensor (S601), and if the document sheet is present, whether the status has been changed from the absence of document sheet to the presence of document sheet or not (S602). If the status has been changed from the absence of document sheet to the presence of document sheet, the output of the document sheet width sensor of the ADF is checked (S603), then "ADF document sheet present" information and the document sheet width information based on the output of the document sheet width sensor of the ADF are stored in the RAM (S604), and the notice information flag indicating that the notice information to the connected external information processing terminal 118 is present is set (S605).

In S601, if the document sheet is absent in the ADF, whether the status has been changed from the presence of document sheet to the absence of document sheet or not is determined (S615). If the status has been changed from the presence of document sheet to the absence of document sheet, "ADF document sheet absent" information is stored in the RAM (S616), and the notice information flag is set (S605).

Without regard to the presence or absence of the document sheet in the ADF, the status information on the ADF is not acquired unless there is a change in the detection status of the document sheet (S602, S615).

The CPU 101 then moves to the acquiring of information on the record sheet cassette of the printer unit. Assuming that the number of record sheet cassettes loadable to the facsimile apparatus is three, the same process is repeated for the cassette 1 to the cassette 3 to acquire the record sheet cassette information. First, the CPU 101 set the parameter n of the cassette to 1 (S606) to determine whether the cassette 1 has been loaded to the facsimile apparatus or not (S607). If the cassette 1 has been loaded to the facsimile apparatus, whether the set status of the cassette 1 has been changed from the cassette not loaded to the cassette loaded or not is determined based on the information in the RAM (S608), and if the cassette 1 status has been changed from the cassette not loaded to the cassette loaded, the record sheet size of the cassette 1 is detected (S609) and the presence or absence of the record sheet of the cassette 1 is detected (S610), based on the output from the sensor (S609). The "cassette 1 loaded" information, the cassette 1 record sheet size information and the information on the presence or absence of the records sheet are stored in the RAM (S611), and the notice information flag is set (S612).

In S607, if the cassette 1 has not been loaded, whether the cassette 1 load status has been changed from the cassette loaded to the cassette not loaded or not (S617), and if the cassette 1 load status has been changed from the cassette loaded to the cassette not loaded, the "cassette 1 not loaded" information is stored in the RAM (S618) and the notice information flag is set (S612).

Without regard to the presence or absence of the cassette 1, the status information on the cassette 1 is not acquired unless there is a change in the load status of the cassette 1, and whether the parameter n of the cassette is smaller than three (whether the cassette information has been acquired for the cassette 1 to the cassette 3) or not is determined (S613), and if the cassette parameter n is smaller than three, the parameter n is incremented (S614) and the above process (S607 to S612, S617, S618) are executed for the cassettes 2 and the cassette 3 to acquire the information on the presence or absence of record sheet cassette loadable to the facsimile apparatus, the record sheet size and the presence or absence of record sheet, and then the process is terminated.

The process for the facsimile apparatus to receive the command from the connected external information processing terminal 118 and indicate the presence of the notice information to the external information processing terminal 118 is similar to that shown in FIGS. 5A and 5B.

The present invention is not limited to the embodiments described above but various modifications thereof may be made.

What is claimed is:

1. A data communication apparatus comprising:
   an interface unit adapted to receive inquiries and commands from an external information processing terminal and to transmit responses to the external information processing terminal;
   a status monitor adapted to monitor a status of said data communication apparatus; and
   a memory adapted to store status information regarding the status of said data communication apparatus and status-change information indicating whether a change in the status of said data communication apparatus has occurred,
   wherein, when said status monitor determines that a change has occurred in the status of said data communication apparatus, the status information stored in said memory is updated and the status-change information stored in said memory is set to indicate that a change has occurred,
   wherein, when an inquiry about the status of said data communication apparatus is received from the external information processing terminal and if the status-change information is set to indicate that a change has occurred, said interface unit transmits the status information stored in said memory to the external information processing terminal in response, and then the status-change information stored in said memory is set to indicate no change, and wherein, when a command unrelated to status is received from the external information processing terminal, said interface unit transmits a response to the command and, if the status-change information stored in said memory is set to indicate that a change has occurred, said interface unit adds to the response an indication that a status change has occurred to prompt the external information processing terminal to inquire about the status of said data communication apparatus.

2. A data communication apparatus according to claim 1, wherein the response includes information indicating whether the command is to be accepted or not.

3. A data communication apparatus according to claim 1, wherein the status of said data communication apparatus is detected by said status monitor.

4. A data communication apparatus according to claim 3, wherein the status information includes information on a status of a data input unit of said data communication apparatus, information on a status of a data output unit of said data communication apparatus, and information on an operation status of said data communication apparatus.

5. A data communication apparatus according to claim 1, wherein a response indicating no change in the status information is transmitted to the information processing terminal, when the inquiry about the status of said data communication apparatus is received and the status-change information stored in said memory is set to indicate no change.

6. A data communication apparatus according to claim 1, wherein said status monitor periodically monitors the status of said data communication apparatus and, upon detection of a change in the status, sets the status-change information stored in said memory to indicate that a change has occurred.

7. A processing method of an information processing terminal in communication with a data communication apparatus, said method comprising the steps of:
    transmitting to the data communication apparatus a status inquiry regarding a status of the data communication apparatus or a command unrelated to status, wherein the status inquiry is transmitted in a predetermined cycle;
    if a status inquiry is transmitted in said transmitting step, receiving status information from the data communication apparatus;
    if a command unrelated to status is transmitted in said transmitting step, receiving a response to the command from the data communication apparatus;
    detecting whether the response to the command includes information indicating that a change in the status of the data communication apparatus has occurred,
    wherein, if it is detected in said detecting step that the response includes information indicating that a change has occurred, said transmitting step transmits a status inquiry to the data communication apparatus out of the predetermined cycle.

8. A processing method according to claim 7, wherein the information processing terminal transmits a command to the data communication apparatus in accordance with a request from a terminal of a local area network.

9. A processing method according to claim 7, wherein the status information of the data communication apparatus status is stored in a memory, and the stored status information may be displayed.

10. A processing method according to claim 9, wherein the status information stored in the memory is updated when the received status information indicates a change.

11. A storage medium storing a computer-readable program for implementing a processing method of an information processing terminal in communication with a data communication apparatus, the program comprising:
    program code for a transmission step of transmitting to the data communication apparatus a status inquiry regarding a status of the data communication apparatus or a command unrelated to status, wherein the status inquiry is transmitted in a predetermined cycle;
    program code for a reception step of, if a status inquiry is transmitted in the transmission step, receiving status information from the data communication apparatus, or, if a command unrelated to status is transmitted in the transmission step, receiving a response to the command from the data communication apparatus;
    program code for a detection step of detecting whether the response to the command includes information indicating that a change in the status of the data communication apparatus has occurred,
    wherein, if it is detected in the detection step that the response includes information indicating that a change has occurred, the transmission step transmits a status inquiry to the data communication apparatus out of the predetermined cycle.

12. A storage medium according to claim 11, the information processing terminal transmits a command to the data communication apparatus in accordance with a request from a terminal of a local area network.

13. A storage medium according to claim 11, wherein the program further comprises:
    program code for a storage step of storing the status information of the data communication apparatus status in a memory; and
    program code for a display step of displaying the stored status information.

14. A storage medium according to claim 13, wherein further comprises program code for an update step of updating the statue information stored in the memory when the received status information indicates a change.

15. A processing method in an information processing terminal in communication with an image processing apparatus, said method comprising the steps of:
    transmitting to the image processing apparatus, in a predetermined cycle, a command for requesting performance of a predetermined process, wherein the command is unrelated to status;
    receiving information generated in the image processing apparatus in response to the transmitted command;
    analyzing the received information; and
    recognizing whether or not the received information includes additional information indicating a status change in the image processing apparatus, in accordance with an analysis result, the additional information being unrelated to the transmitted command,
    wherein, when said recognizing step recognizes that the additional information is included, said transmitting step transmits to the image processing apparatus a command corresponding to the additional information, out of the predetermined cycle.

16. A processing method according to claim 15, wherein said analyzing step includes analyzing the received information, which includes a response to the command and the additional information indicating a status change into image processing apparatus.

17. A processing method according to claim 16, wherein said transmitting step includes transmitting a command requesting details of the status change in the image processing apparatus, when it is recognized in said recognizing step That a status change has occurred into image processing apparatus.

18. A processing method according to claim 15, wherein said transmitting step includes cyclically transmitting the command using a timer.

19. A processing method according to claim 15, wherein said transmitting step includes transmitting the command based on a manual instruction by an operator.

20. A processing method according to claim 16, further comprising the step of displaying predetermined information regarding the status change.

21. A processing method according to claim 20, wherein said displaying step includes displaying information concerning an error condition of the image processing apparatus.

22. A communication method in a data communication apparatus in communication with an external information processing terminal, said method comprising the steps of:

receiving an inquiry or a command from the external information processing terminal;

transmitting a response to the external information processing terminal;

monitoring a status of the data communication apparatus; and storing in a memory status information regarding the status of the data communication apparatus and status-change information indicating whether a change in the status of the data communication apparatus has occurred, wherein, when it is determined in said monitoring step that a change has occurred in the status of the data communication apparatus, the status information stored in the memory is updated and the status-change information stored in the memory is set to indicate that a change has occurred, wherein, when an inquiry about the status of the data communication apparatus is received from the external information processing terminal and if the status-change information is set to indicate that a change has occurred, the response transmitted in said transmitting step includes the status information stored in the memory and then the status-change information stored in the memory is set to indicate no change, and wherein, when a command unrelated to status is received from the external information processing terminal, a response to the command is transmitted in said transmitting step and, if the status-change information stored in the memory is set to indicate that a change has occurred, the response includes an indication that a status change has occurred to prompt the external information processing terminal to inquire about the status of the data communication apparatus.

23. A storage medium storing a computer-readable program for implementing a communication method in a data communication apparatus in communication with an external information processing terminal, the program comprising:

program code for a reception step of receiving an inquiry or a command from the external information processing terminal;

program code for a transmission step of transmitting a response to the external information processing terminal;

program code for a monitoring step of monitoring a status of the data communication apparatus; and program code for a storage step of storing, in a memory, status information regarding the status of the data communication apparatus and status-change information indicating whether a change in the status of the data communication apparatus has occurred, wherein, when it is determined in the monitoring step that a change has occurred in the status of the data communication apparatus, the status information stored in the memory is updated and the status-change information stored in the memory is set to indicate that a change has occurred, wherein, when an inquiry about the status of the data communication apparatus is received from the external information processing terminal and if the status-change information is set to indicate that a change has occurred, the response transmitted in the transmission step includes the status information stored in the memory and then the status-change information stored in the memory is set to indicate no change, and wherein, when a command unrelated to status is received from the external information processing terminal, a response to the command is transmitted in the transmission step and, if the status-change information stored in the memory is set to indicate that a change has occurred, the response includes an indication that a status change has occurred to prompt the external information processing terminal to inquire about the status of the data communication apparatus.

24. A storage medium storing a computer-readable program for implementing a processing method in an information processing terminal in communication with an image processing apparatus, the program comprising:

program code for a transmission step of transmitting to the image processing apparatus, in a predetermined cycle, a command for requesting performance of a predetermined process, wherein the command is unrelated to status;

program code for a reception step of receiving information generated in the image processing apparatus in response to the transmitted command;

program code for an analysis step of analyzing the received information; and program code for a recognition step of recognizing whether or not the received information includes additional information indicating a status change in the image processing apparatus, in accordance with an analysis result, the additional information being unrelated to the transmitted command, wherein, when the recognition step recognizes that the additional information is included, the transmission step transmits to the image processing apparatus a command corresponding to the additional information, out of the predetermined cycle.

* * * * *

UNITED STATES PATENT AND TRADEMARK OFFICE
CERTIFICATE OF CORRECTION

PATENT NO. : 6,667,813 B2
DATED : December 23, 2003
INVENTOR(S) : Saruwatari et al.

It is certified that error appears in the above-identified patent and that said Letters Patent is hereby corrected as shown below:

<u>Title page,</u>
Item [*] Notice, delete the phrase "by 124 days" and insert -- by 0 days --

Signed and Sealed this

Nineteenth Day of April, 2005

JON W. DUDAS
*Director of the United States Patent and Trademark Office*